United States Patent
Al-Dahlan et al.

(10) Patent No.: US 10,047,277 B2
(45) Date of Patent: Aug. 14, 2018

(54) NON-ACIDIC EXOTHERMIC SANDSTONE STIMULATION FLUIDS

(71) Applicant: Saudi Arabian Oil Company, Dhahran (SA)

(72) Inventors: Mohammed Nasser Al-Dahlan, Al-Khouber (SA); Ayman Raja Al-Nakhli, Dammam (SA); Abdullah Mohammed Al-Harith, Althoqbah (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/385,105

(22) Filed: Dec. 20, 2016

(65) Prior Publication Data

US 2017/0101577 A1     Apr. 13, 2017

Related U.S. Application Data

(62) Division of application No. 13/744,333, filed on Jan. 17, 2013, now Pat. No. 9,556,718.

(60) Provisional application No. 61/587,212, filed on Jan. 17, 2012.

(51) Int. Cl.
| | |
|---|---|
| C09K 8/62 | (2006.01) |
| E21B 43/25 | (2006.01) |
| E21B 43/24 | (2006.01) |
| C09K 8/60 | (2006.01) |

(52) U.S. Cl.
CPC ............... *C09K 8/62* (2013.01); *C09K 8/607* (2013.01); *E21B 43/24* (2013.01); *E21B 43/25* (2013.01)

(58) Field of Classification Search
CPC . C09K 8/607; C09K 8/62; C09K 8/72; C09K 8/845; E21B 43/166; E21B 43/24; E21B 43/25
See application file for complete search history.

(56) References Cited

U.S. PATENT DOCUMENTS

| | | |
|---|---|---|
| 1,819,055 A | 8/1931 | Jan et al. |
| 1,990,969 A | 2/1935 | Wilson |
| 2,094,479 A | 9/1937 | Vandergrift et al. |

(Continued)

FOREIGN PATENT DOCUMENTS

| | | |
|---|---|---|
| CN | 101323780 A | 12/2008 |
| CN | 101 839 123 A | 9/2010 |

(Continued)

OTHER PUBLICATIONS

Ashton, J.P., et al., "In-Situ Heat System Stimulates Paraffinic-Crude Producers in Gulf of Mexico," SPE 15660, SPE Production Engineering, May 1989, pp. 157-160, vol. 4, No. 2, Society of Petroleum Engineers.

(Continued)

*Primary Examiner* — Alicia Bland
(74) *Attorney, Agent, or Firm* — Bracewell LLP; Constance G. Rhebergen; Kevin R. Tamm

(57) ABSTRACT

Provided is a method and composition for the in-situ generation of synthetic sweet spots in tight-gas formations. The composition can include nitrogen generating compounds, which upon activation, react to generate heat and nitrogen gas. The method of using the composition includes injecting the composition into a tight-gas formation such that upon activation, the heat and nitrogen gas generated.

13 Claims, 3 Drawing Sheets

(56) References Cited

U.S. PATENT DOCUMENTS

| | | |
|---|---|---|
| 2,288,556 A | 6/1943 | Vollmer |
| 2,466,674 A | 4/1949 | Mullady et al. |
| 2,606,813 A | 8/1952 | Kahr |
| 2,699,213 A | 1/1955 | Cardwell et al. |
| 2,885,004 A | 5/1959 | Perry |
| 3,025,911 A | 3/1962 | Bergman |
| 3,354,954 A | 11/1967 | Buxton |
| 3,385,360 A | 5/1968 | Smith |
| 3,405,761 A | 10/1968 | Parker |
| 3,476,183 A | 11/1969 | Haynes, Jr. et al. |
| 3,483,923 A | 12/1969 | Darley |
| 3,543,856 A | 12/1970 | Knox et al. |
| 3,568,772 A | 3/1971 | Gogarty et al. |
| 3,576,596 A | 4/1971 | Kranc et al. |
| 3,707,192 A | 12/1972 | Goins et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,864,451 A | 2/1975 | Lee et al. |
| 4,056,146 A | 11/1977 | Hall |
| 4,085,799 A | 4/1978 | Bousaid et al. |
| 4,136,739 A | 1/1979 | Salathiel et al. |
| 4,158,042 A | 6/1979 | Deutschman |
| 4,178,993 A | 12/1979 | Richardson et al. |
| 4,210,628 A | 7/1980 | Ninomiya et al. |
| 4,219,083 A * | 8/1980 | Richardson .............. C09K 8/60 166/300 |
| 4,232,740 A | 11/1980 | Park |
| 4,232,741 A | 11/1980 | Richardson et al. |
| 4,291,765 A | 9/1981 | Gilchrist et al. |
| 4,330,037 A | 5/1982 | Richardson et al. |
| 4,399,868 A | 8/1983 | Richardson et al. |
| 4,410,041 A | 10/1983 | Davies et al. |
| 4,414,118 A | 11/1983 | Murphey |
| 4,454,918 A | 6/1984 | Richardson et al. |
| 4,475,595 A | 10/1984 | Watkins et al. |
| 4,482,016 A | 11/1984 | Richardson |
| 4,485,007 A | 11/1984 | Tam et al. |
| 4,491,180 A | 1/1985 | Brown et al. |
| 4,518,040 A | 5/1985 | Middleton |
| 4,572,297 A | 2/1986 | Thigpen, Jr. et al. |
| 4,615,391 A | 10/1986 | Garthoffner |
| 4,703,803 A | 11/1987 | Blumer |
| 4,842,073 A | 6/1989 | Himes et al. |
| 4,846,277 A | 7/1989 | Khalil et al. |
| 4,865,826 A | 9/1989 | Carnell et al. |
| 4,898,750 A | 2/1990 | Friedman et al. |
| 4,919,209 A | 4/1990 | King |
| 5,082,058 A | 1/1992 | Blumer |
| 5,087,350 A | 2/1992 | Paris-Marcano |
| 5,152,906 A | 10/1992 | Aften et al. |
| 5,183,581 A | 2/1993 | Khalil et al. |
| 5,197,544 A | 3/1993 | Himes |
| 5,209,295 A | 5/1993 | Campos et al. |
| 5,342,530 A | 8/1994 | Aften et al. |
| 5,358,565 A | 10/1994 | Shu |
| 5,375,660 A | 12/1994 | Wehunt |
| 5,411,094 A | 5/1995 | Northrop |
| 5,639,313 A | 6/1997 | Khalil |
| 5,958,224 A | 9/1999 | Ho et al. |
| 6,035,933 A | 3/2000 | Khalil et al. |
| 6,277,271 B1 | 8/2001 | Kocal |
| 6,500,219 B1 | 12/2002 | Gunnerman |
| 6,554,071 B1 | 4/2003 | Reddy et al. |
| 6,662,874 B2 | 12/2003 | Surjaatmadja et al. |
| 6,722,434 B2 | 4/2004 | Reddy et al. |
| 6,827,845 B2 | 12/2004 | Gong et al. |
| 6,881,325 B2 | 4/2005 | Morris et al. |
| 6,992,048 B2 | 1/2006 | Reddy et al. |
| 7,029,639 B2 | 4/2006 | Yasutake et al. |
| 7,059,414 B2 | 6/2006 | Rae et al. |
| 7,066,260 B2 | 6/2006 | Sullivan |
| 7,153,434 B1 | 12/2006 | Dennis |
| 7,328,746 B2 | 2/2008 | Al-Taq et al. |
| 7,540,328 B2 | 6/2009 | Brown et al. |
| 7,589,050 B2 | 9/2009 | Frenier et al. |
| 7,624,743 B2 | 12/2009 | Sarkar et al. |
| 7,686,084 B2 | 3/2010 | Reddy et al. |
| 7,779,915 B2 | 8/2010 | Hutchins et al. |
| 7,947,629 B2 | 5/2011 | Fuller |
| 8,096,361 B2 | 1/2012 | Willberg |
| 8,216,344 B2 | 7/2012 | Degenstein et al. |
| 8,282,715 B1 | 10/2012 | Degenstein et al. |
| 8,962,536 B2 | 2/2015 | Winslow et al. |
| 2003/0092581 A1 | 5/2003 | Crews |
| 2003/0221831 A1 | 12/2003 | Reddy et al. |
| 2005/0000694 A1 | 1/2005 | Dalrymple et al. |
| 2005/0215439 A1 | 9/2005 | Blair |
| 2006/0144591 A1 | 7/2006 | Gonzalez et al. |
| 2006/0154814 A1 | 7/2006 | Zanibelli et al. |
| 2008/0066784 A1 * | 3/2008 | Sarkar .................. C09K 8/524 134/22.1 |
| 2008/0121395 A1 | 5/2008 | Reddy |
| 2008/0190607 A1 | 8/2008 | Minnich et al. |
| 2008/0190610 A1 | 8/2008 | Barmatov et al. |
| 2008/0289828 A1 | 11/2008 | Hutchins et al. |
| 2008/0318812 A1 | 12/2008 | Kakadjian, Sr. et al. |
| 2009/0042748 A1 | 2/2009 | Fuller |
| 2009/0098467 A1 | 4/2009 | Lowe et al. |
| 2010/0056399 A1 | 3/2010 | Berkland et al. |
| 2010/0170453 A1 | 7/2010 | Betzer-Zilevitch |
| 2010/0288499 A1 | 11/2010 | Al-Dhafeeri et al. |
| 2011/0030958 A1 | 2/2011 | Fedorov et al. |
| 2011/0203797 A1 | 8/2011 | Alexandrov et al. |
| 2011/0220360 A1 | 9/2011 | Lindvig et al. |
| 2012/0211225 A1 | 8/2012 | Kostrov et al. |
| 2013/0123151 A1 | 5/2013 | Crews |
| 2013/0126169 A1 | 5/2013 | Al-Nakhli et al. |
| 2013/0180720 A1 | 7/2013 | Al-Dahlan et al. |
| 2014/0090839 A1 | 4/2014 | Al-Nakhil et al. |
| 2014/0144632 A1 | 5/2014 | Zavolzhski et al. |

FOREIGN PATENT DOCUMENTS

| | | |
|---|---|---|
| EP | 0654582 A1 | 5/1995 |
| EP | 0 909 873 A1 | 4/1999 |
| JP | 2001019984 | 1/2001 |
| JP | 2005015533 A | 1/2005 |
| RU | 2100583 C1 | 12/1997 |
| RU | 2126084 C1 | 2/1999 |
| RU | 2194156 C1 | 12/2002 |
| SU | 1677260 | 9/1991 |
| WO | 0037777 A1 | 6/2000 |
| WO | 2006131895 A1 | 12/2006 |
| WO | 2007015391 | 2/2007 |
| WO | 2008032067 A1 | 3/2008 |
| WO | 2009009370 A1 | 1/2009 |
| WO | 2009070561 A1 | 6/2009 |
| WO | 2010046618 A1 | 4/2010 |
| WO | 2010047612 A1 | 4/2010 |
| WO | 2012012224 A1 | 1/2012 |
| WO | 2012025150 A1 | 3/2012 |
| WO | 2012082402 A2 | 6/2012 |
| WO | 2013078306 A1 | 5/2013 |

OTHER PUBLICATIONS

Sano, "Two-step Adsorption Process for Deep Desulfurization of Diesel Oil," Fuel 84 (2005) 903-910.

Khalil, C.N., et al., "Detection of Formation Damage Associated to Paraffin in Reservoirs of the Reconcavo Baiano, Brazil," SPE 37238, Int'l Symposium on Oilfield Chemistry held in Houston, TX, Feb. 18-21, 1997, Society of Petroleum Engineers, Inc.

Xiang Gao, "Adsorption and Reduction of NO2 Over Activated Carbon at Low Temperature," Fuel Processing Technology 92, 2011, pp. 139-146.

Marques, L.C.C., et al., "A New Technique to Solve Gas Hydrate Problems in Subsea Christmas Trees." SPE 77572, SPE Production & Facilities, Nov. 2004, pp. 253-258, Society of Petroleum Engineers.

(56) References Cited

OTHER PUBLICATIONS

PCT International Search Report and the written opinion dated Apr. 8, 2014; International Application No. PCT/US2013/043076; International filing date May 29, 2013.
Al-Nakhli, Chemically-Induced Pressure Pulse to Increase Stimulated Reservoir Volume in Unconventional Reservoirs, Unconventional Resources Technology Conference, Denver, CO, Aug. 25-27, 2014.
Mure Te, "Oxidation Reactivities of Dibenzothiophenes in Polyoxometalate/H2O2 and Formic Acid/H2O2 Systems," Applied Catalysis A: General 219, 2001, pp. 267-280.
PCT Notification of Transmittal of the International Search Report and the Written Opinion of the International Searching Authority, or the Declaration; dated Mar. 5, 2013; International Appln No. PCT/US2012/066249; Int'l File Date: Nov. 21, 2012.
Isao Mochida, "Adsorption and Adsorbed Species of SO2 during its Oxidative Removal over Pitch-Based Activated Carbon Fibers," Energy & Fuels, vol. 13, No. 2, 1999, pp. 369-373.
European Search Report and Written Opinion dated Aug. 2, 2013, for related European Patent Application 13174172.
Anning Zhou et al., Deep Desulfurization of Diesel Fuels by Selective Adsorption with Activated Carbons, American Chemical Society, Washington, DC, vol. 49, No. 3, Jul. 1, 2004, pp. 329-332.
Yosuke Sano et al., Selection and Further Activation of Activated Carbons for Removal of Nitrogen Species in Gas Oil as a Pretreatment for its Deep Hydrodesulfurization, Energy & Fuels, vol. 18, Mar. 20, 2004, pp. 644-651.
Cheng Yun-Fu, Preparation and Field Uses of Heat Generating Hydrofracturing Fluids, Oilfield Chemistry Research Institute of Drilling and Production, Dagang Oil Fields, Dagang Oilfield Group Co., Ltd., vol. 14, No. pp. 24-27, Mar. 25, 1997.
Related U.S. Appl. No. 14/689,874, filed Apr. 17, 2015, titled "Chemically-Induced Pulsed Fracturing Method" (SA5309).
Examination Report dated Jun. 28, 2011 for related European Patent Application No. 08857250.9.
Isao Mochida, "Removal of SOx and NOx over activated carbon fibers," Carbon, vol. 38, 2000 pp. 227-239.
Yosuke Sano, "Adsorptive Removal of Sulfur and Nitrogen Species from a Straight Run Gas Oil Over Activated Carbons for its Deep Hydrodesulfurization," Applied Catalysis B: Environmental 49, 2004, pp. 219-225.
E. Raymundo-Pinero, "Temperature Programmed Desorption Study on the Mechanism of SO2 oxidation by Activated Carbon and Activated Carbon Fibres," Carbon, vol. 39, 2001, pp. 231-242.
N. Shirahama, "Mechanistic Study on Adsorption and Reduction of NO2 Over Activated Carbon Fibers," Carbon, vol. 40, 2002, pp. 2605-2611.
Isao Mochida, Kinetic Study of the Continuous Removal of SOx on Polyacrylonnitrile-Based Activated Carbon Fibres, Fuel vol. 76, No. 6, 1997, pp. 533-536.
Satoru Murata, "A Novel Oxidative Desulfurization System for Diesel Fuels with Molecular Oxygen in the Presence of Cobalt Catalysts and Aldehydes," Energy & Fuels, vol. 18, No. 1, 2004, pp. 116-121.
Kazaumasa Yazu, "Immobolized Tungstophosphoric Acid-Catalyzed Oxidative Desulfurization of Diesel Oil with Hydrogen Peroxide," Journal of Japan Petroleum Institute, vol. 46, No. 6, 2003, pp. 379-382.
Antonio Chica, "Catalytic Oxidative Desulfurization (ODS) of Diesel Fuel on a Continuous Fixed-Bed Reactor," Journal of Catalysis, vol. 242, 2006, pp. 229-308.
Jeyagowry Sampanthar, "A Novel Oxidative Desulfurization Process to Remove Refractory Sulfur Compounds From Diesel Fuel," Applied Catalysis B: Environmental 63, 2006, pp. 85-93.
Shujiro Otsuki, "Oxidative Desulfurization of Light Gas Oi and Vacuum Gas Oil by Oxidation and Solvent Extraction," Energy & Fuels, vol. 14, No. 6, 2000, pp. 1232-1239.
Kazumasa Yazu, "Oxidative Desulfurization of Diesel Oil with Hydrogen Peroxide in the Presence of Acid Catalyst in Diesel Oil/Acetic Acid Biphase System," Chemistry Letters, vol. 33, No. 10, 2004, pp. 1306-1307.
Paolo DeFilippis, "Oxidative Desulfurization: Oxidation Reactivity of Sulfur Compounds in Different Organic Matrixes," Energy & Fuels, vol. 17, No. 6, 2003, pp. 1452-1455.
Related U.S. Appl. No. 14/689,901, filed Apr. 17, 2015, titled "Method for Enhanced Fracture Cleanup Using Redox Treatment" (SA5219).
Kiryukhin, et al., Thermal-Hydrodynamic Modeling of Laboratory Tests on the Interaction of NaNO3—NaOH Fluids with Sandstone Rock at a Deep Radionuclide Repository Site, pp. 1-20, Russia.
Schlumberger, Systems, Sand Control Pumping, pp. 37-70, USA.
PCT Notification of Transmittal of the International Search Report and the Written Opinion of the International Searching Authority, or the Declaration; dated Mar. 18, 2013; International Application No. PCT/US2013/021961; International File Date: Jan. 17, 2013.
Database WPI, Week 201115, XP-002693470, Thomson Scientific, London, GB, C:\EPOPROGS\SEA\.\..\..\epodata\sea\eplogf\internal.log.

* cited by examiner

NON-ACIDIC EXOTHERMIC SANDSTONE STIMULATION FLUIDS

RELATED APPLICATION

This application is a divisional of and claims priority to and the benefit of U.S. patent application Ser. No. 13/744,333, filed on Jan. 17, 2013, which claims priority to U.S. Provisional Patent Application No. 61/587,212 titled "Non-Acidic Exothermic Sandstone Stimulation Fluids," filed on Jan. 17, 2012, the disclosures of which are incorporated herein by reference in their entirety.

FIELD OF THE INVENTION

This invention relates to oil and gas well stimulation and compositions for the stimulation of hydrocarbon bearing oil and gas containing formations. More specifically, the invention provides a method for the stimulation of a hydrocarbon bearing oil or gas formation wherein non-acidic stimulation fluids and exothermic reactants are injected into the formation.

BACKGROUND OF THE INVENTION

The search for and recovery of oil is becoming increasingly difficult as world-wide petroleum reserves decline. In many instances, reserves trapped within certain low permeability formations, such as certain sandstone, carbonate, and/or shale formations, exhibit little or no production, and are thus economically undesirable to develop at current oil and gas prices. Well stimulation is one method that is frequently employed to increase the net permeability of a formation or reservoir, thereby leading to increased production from these wells that have little or no production.

During well stimulation operations, chemicals can be injected into the formation in a process known as well stimulation. Some exemplary known stimulation techniques include: (1) injection of chemicals into the wellbore wherein the chemicals react with and/or dissolve production limiting conditions (e.g., the presence of clays and drilling solids); (2) injection of chemicals through the wellbore and into the formation to react with and/or dissolve portions of the formation, thereby creating alternative flow paths for recoverable hydrocarbons (e.g., acid-fracturing or matrix-fracturing processes); and (3) high pressure injection of water or chemicals through the wellbore and into the formation at pressures that are sufficient to fracture the formation, thereby creating new or additional flow channels through which hydrocarbons can more readily move from the formation into the wellbore.

In certain tight reservoirs, well productivity is typically low, thus making the well non-economical from a standpoint of development. One commonly employed technique for stimulating low productivity wells is hydraulic fracturing, which can involve the injection of fluids, such as high viscosity fluids, into the well at a sufficiently high rate so that enough pressure is built up inside the wellbore to split the formation apart or fractures. The resulting hydraulically induced fracture that is produced as a result of the fracturing can extend from the wellbore deep into the formation.

Sandstone formations can be particularly susceptible to formation damage from formation minerals such as clay and other siliceous deposits. Stimulation methods for these types of formations have typically employed acid or acid-based fluids for the treatment or stimulation due to the ability of the acid or acid-based fluid to readily dissolve both formation minerals and contaminants (e.g., drilling fluids that may be coating the wellbore or that has penetrated into the formation) introduced into the wellbore/formation during drilling or remedial operations.

The removal of formation minerals and other deposits, such as clays, drilling solids, or precipitates, are key concerns in well completion operations. As noted above, the known prior art techniques typically involve acids, often highly concentrated acids such as hydrofluoric acid (HF) and HCl—HF acid mixtures, which are both highly corrosive and can create dangerous operating conditions. In a typical HF based well stimulation, a preflush solution that includes ammonium or potassium chloride is injected into a well, followed by the injection of a well stimulation fluid (either mud based or organic based) that includes HF or an HF/HCl mixture into the formation. After allowing the well stimulation fluid to react with the formation for a predetermined amount of time, an overflush solution that includes HCl and/or brine (which can include ammonium or potassium chloride) is injected into the formation to end the reaction of the stimulation fluid with the formation. In many instances, the reaction of the acid with the formation is rapid, frequently instantaneous, thereby limiting the penetration depth of the acid.

One difficulty that is frequently encountered with traditional sandstone stimulation operations that employ HF as a stimulation fluid is that HF can precipitate into the formation, typically as a fluoride, thereby causing formation damage and limiting the efficiency of the matrix stimulation treatment. The damage caused by fluoride precipitation can be aggravated at the higher temperatures that are typically encountered in the formation. Another difficulty encountered with traditional HF sandstone stimulation is the acid reacts very rapidly with the formation, often instantaneously, thereby limiting the penetration of the acid into the formation. Therefore, it would be advantageous to develop a stimulation fluid and method of using same that reacts at a slower rate with the formation and which does not form precipitants upon reaction with the sandstone formation at high temperatures.

SUMMARY

Generally, methods and compositions for the stimulation of sandstone formations are provided.

In one aspect, a non-acidic well stimulation composition is provided for use in sandstone formations. The composition includes an ammonium containing compound; a nitrite containing compound; and a non-acidic well stimulation fluid.

In another aspect, a method for stimulating production of hydrocarbons from a hydrocarbon contacting formation is provided. The method comprises the steps of injecting an aqueous preflush solution into the formation that includes a heat generating composition. The heat generating composition includes ammonium and nitrite ion containing compounds. In one embodiment, at least one of the ammonium and nitrite ion containing compounds is encapsulated with a coating that is erodible such that reaction between the ammonium and nitrite ions is delayed until the ammonium and nitrite containing compounds have migrated to within the formation, thereby allowing the ammonium and nitrite containing compounds to react and generate heat and nitrogen gas. The method includes the step of injecting into the formation an acid-free well stimulation composition that includes sodium hydroxide, ammonium containing compounds and nitrite containing compounds, wherein the well stimulation composition is operable to dissolve at least a portion of the sandstone formation. The acid-free well stimulation composition reacts with the formation. The method then includes the step of injecting an overflush solution that includes brine into the formation such that the overflush solution stops the reaction between the well stimulation composition and the formation. The ammonium containing compound and nitrite containing compound present in the preflush and acid-free well stimulation compositions are operable to react to produce heat.

DETAILED DESCRIPTION OF THE INVENTION

Figure 1:
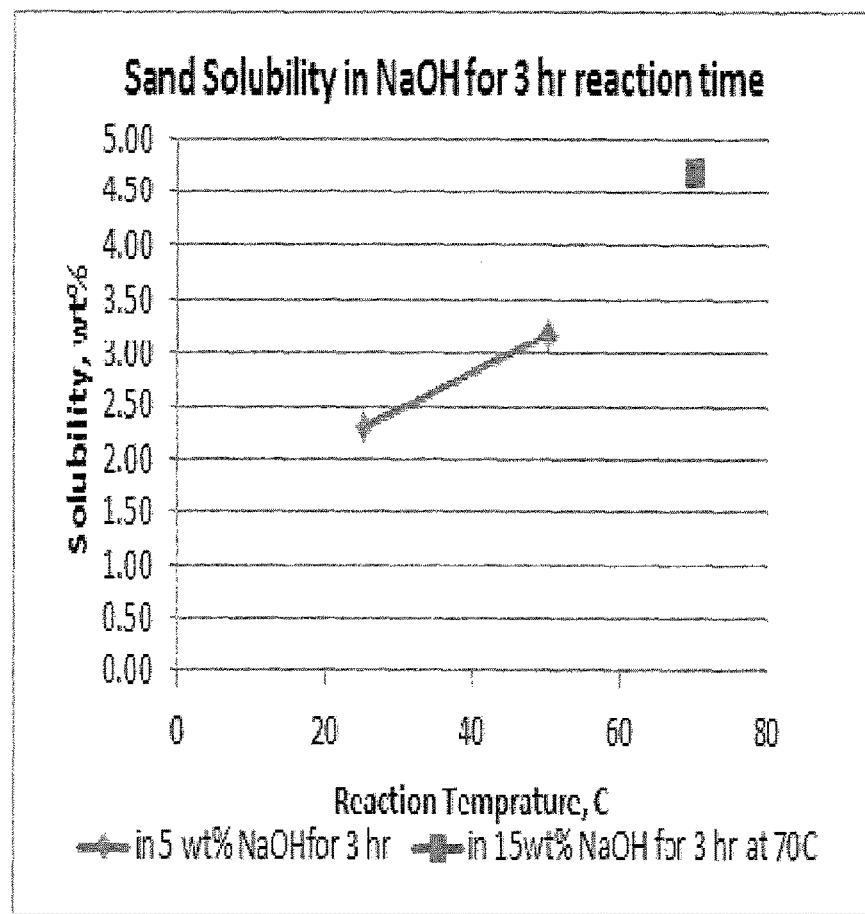
FIG. 1 is a graph showing the solubility of sand in sodium hydroxide as a function of temperature.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

As used herein, "sandstone" refers to any formation primarily composed of silica, silicate minerals and various forms of feldspar and clays. The grains of sandstone rock are traditionally sand-sized.

The present invention addresses problems associated with prior art methods for the stimulation of sandstone formations at high temperatures, particularly problems encountered when highly corrosive acids, such as HF, are employed, and provides new non-acidic stimulation methods. The methods described herein generally includes a three step process that includes the steps of injecting a preflush brine, followed by injecting a non-acidic stimulation solution, and finally injecting an overflush brine.

Typically, the non-acidic stimulation fluid includes an alkali or alkaline earth hydroxide, such as sodium hydroxide. In certain embodiments, the non-acidic stimulation fluid primarily includes sodium hydroxide. The sodium hydroxide solution reacts with the sandstone formation much more slowly than typical acidic stimulation fluids, enabling deeper penetration of the stimulation fluid into the sandstone formation. Additionally, the sodium hydroxide solution does not react with the formation in a way that leads to the formation of precipitates during reaction.

As used herein, "preflush" refers to a fluid that is pumped into the wellbore ahead of a main stimulation treatment fluid to displace ions, such as potassium, sodium, and calcium. In certain embodiments, the preflush is operable to minimize the possibility of adverse reactions with the treating fluids and the formation of unwanted precipitates, which can lead to clogging of the pores of the formation.

The preflush solution can include a heat generating composition that is supplied to the formation for the purpose of increasing the temperature within the formation. Exemplary compounds present in the heat generating composition include ammonium ions and nitrite ions (for example, present as $NH_4Cl$ and $NaNO_2$). In certain embodiments, the preflush brine solution can include halide-containing brines. In one embodiment, the preflush brine can be aqueous ammonium chloride, having for example, a concentration range of between about 1 and 20% by weight, alternatively between about 5 to 10% by weight, alternatively between 5-7% by weight, alternatively between 7-9% by weight, or alternatively between 9-10% by weight. In certain embodiments, prior to injection into the formation, the preflush brine solution can be preheated to a temperature of up to about 70° C., alternatively up to about 50° C., and alternatively between about 20° C. and 60° C. Upon delivery of the heat generating compounds to the formation, the reactants react to form heat and gas.

As used here, "overflush" refers to a fluid that is pumped into the wellbore after the stimulation fluid has been injected into the formation and the reaction between the stimulation fluid and the formation is complete. The overflush fluid can also, in certain embodiments, help to maintain a low pH environment in the near-wellbore formation, which can help to prevent precipitation of reaction products as the treatment fluids are removed from the formation during the flow back phase of the treatment.

As used herein, "brine" refers to a solid-free aqueous solution that includes dissolved inorganic salts.

As used herein, "non-acidic stimulation fluid" refers to a stimulation fluid that is acid-free that has a pH that is greater than 7. The terms "non-acidic" and "acid-free" may be used interchangeably herein. In certain embodiments, the non-acidic stimulation fluid includes sodium hydroxide.

In one aspect, a method for injecting a non-acidic stimulation fluid into a sandstone formation is provided. In one embodiment, the method consists of three steps: a first step that includes the injection of a preflush brine solution into the formation, a second step that includes the injection of a non-acidic stimulation fluid into the formation, and a third step that includes the injection of an overflush brine solution into the formation.

As used herein, when it is disclosed that the well stimulation fluid includes sodium hydroxide, it is understood that in certain embodiments other hydroxide compounds, for example, calcium hydroxide or potassium hydroxide, may be substituted.

In certain embodiments, the use of a preflush composition that includes heat generating compounds is operable to increase the downhole temperature by at least about 50° C., alternatively at least about 75° C., alternatively at least about 100° C.

In certain embodiments, the temperature within the formation is sufficient to activate the reaction between the compounds in the heat generating composition.

In certain embodiments, when the heat generating compounds can be incorporated with the non-acidic well stimulation fluid, the presence of the sodium hydroxide helps to prevent a premature reaction between the ammonium and nitrite containing compounds, thereby allowing the reactants to reach the formation before the high temperatures within the formation cause the reaction between the heat generating compounds.

The reaction of silicon oxide ($SiO_2$) with sodium hydroxide is provided as follows:

$$SiO_2 + 2NaOH \rightarrow Na_2SiO_3 + H_2O$$

The reaction between the sodium hydroxide and the sandstone formation is generally slow and does not include precipitation of any interfering compounds, as is the case with the use of HF stimulation fluids. At increased temperatures, the reaction between the sodium hydroxide and the formation is facilitated and more efficient, and in certain preferred embodiments heat can be separately supplied to the site of the reaction by other known means. In alternate embodiments, the non-acidic well stimulation fluid can be preheated prior to injection into the formation.

In one embodiment of this invention, the non-acidic stimulation fluid can include sodium hydroxide. In certain embodiments, the concentration of the sodium hydroxide solution can be in a range of between about 2 and 20% by weight, 5 to 15% by weight, alternatively between 5-8% by weight, alternatively between 8-12% by weight, or alternatively between 12-15% by weight. One preferred embodiment includes sodium hydroxide of at least 5% by weight. In a preferred embodiment, sodium hydroxide is at least 10% by weight. In a more preferred embodiment sodium hydroxide is at least 15% by weight. The sodium hydroxide solution is generally injected into the sandstone formation directly following the injection of the preflush brine, and before the injection of the overflush brine. In certain embodiments, the sodium hydroxide solution is allowed to react with the sandstone formation for up to about 1 hour, alternatively for between about 1 and 2 hours, alternatively between about 2 and 3 hours, or alternatively for more than about 3 hours. It is understood, however, that the time during which the non-acidic stimulation fluid is allowed to react with the formation can be varied from minutes (for example, 5 minutes, 15 minutes, or 30 minutes) up to several hours (for example, up to about 12 hours), depending upon the concentration of the stimulation fluid and the type of formation that is being treated. In certain embodiments, prior to injection into the formation, the non-acidic stimulation fluid can be preheated, for example to a temperature of up to about 70° C., alternatively up to about 50° C., alternatively between about 20° C. and 60° C., prior to injection into the formation.

In certain embodiments, the overflush brine solution can be selected from a group of halide-containing brines. Upon the injection of the overflush brine solution into the formation, the reaction between the non-acidic stimulation fluid and the sandstone formation is terminated, thereby ending penetration of the stimulation fluid into the formation. In one embodiment, the overflush brine can be aqueous ammonium chloride in a concentration range of between about 1 and 5% by weight, alternatively between about 5 to 10% by weight, alternatively between 5-7% by weight, alternatively between 7-9% by weight, or alternatively between 9-10% by weight, or alternatively between about 10 and 15% by weight. In certain embodiments, the preflush and overflush brines may have the same composition.

As noted above, in certain embodiments of this invention, any of the fluids that are injected into the sandstone formation, selected from the group that includes the preflush, stimulation and overflush fluids, can be preheated to a temperature of between about 20 to 70° C., prior to injection. In certain embodiments, only the sodium hydroxide containing non-acidic stimulation fluid is preheated before injection, as the higher temperature may enhance the stimulation efficiency of the stimulation fluid solution by enabling a slower reaction time with and deeper penetration into the formation rock.

In certain embodiments, the non-acidic well stimulation techniques and compounds described herein can be coupled with traditional hydraulic fracturing techniques. In certain embodiments, the non-acidic stimulation fluids can be used to treat solids.

In one embodiment, a method is provided for injecting a stimulation fluid into a sandstone formation. The method utilizes the step of the co-injection the heat generating composition. In certain embodiments, the heat generating composition takes advantage of an oxidation-reduction reaction (also referred to herein as a ReDox composition) for the in-situ generation of heat within the formation to provide a means for heating the stimulation fluid. Additionally, the reaction of components of the heat generating composition can generate substantial volumes of nitrogen gas and create an area localized pressure within the formation, which in turn can cause micro-fracturing of the nearby stata to improve permeability of near fracture surface of the formation. In certain embodiments, the method can include the step of supplying a composition that includes compounds that include ammonium ions and nitrite ions to the formation, which can react exothermically and generate heat and gaseous nitrogen. In certain embodiments, all or a portion of the oxidation-reduction composition can be incorporated with fracturing fluids and injected during a hydraulic fracturing treatment. In certain embodiments, a portion of the heat generating composition can be injected into the formation along with or after the injection of the preflush and ahead of the non-acidic stimulation fluid.

The in-situ generation of heat and nitrogen (and resulting increase in pressure within the formation at the reaction site), can increase the permeability of certain gas formations. The heat and gas that are generated by the reaction can cause tensile and thermal fractures within the hydraulically induced and within the existing fractures in the formation. It is understood that the generation of the microfractures within the formation may depend on the type of formation being treated. This, coupled with the administration of the non-acidic well stimulation fluid described herein (such as a sodium hydroxide based fluid), can result in the increased production from the formation as both the heat generating composition and the non-acidic well stimulation fluid act on the formation in a manner that results in increased permeability.

In certain embodiments, the heat generating composition releases significant quantities of nitrogen gas within the formation, which then migrates into the fractures within the formation to form additional microfractures within the formation. The heat generating composition fluids, such as a composition that includes an ammonium compound, a nitrite compound and optionally an activator, are injected to the formation where it migrates within large fractures. Upon reaction, the injected fluids produce heat and nitrogen gas, thereby causing microfractures to develop within the formation, providing pathways for migration of the non-acidic stimulation fluid to enter the formation and for the hydrocarbon molecules trapped within the formation to migrate out of the formation and be recovered.

In yet another embodiment, a composition that includes ammonium ions, nitrite ions, and an activator can be injected into the formation with the preflush brine, wherein at least one of the ammonium ions and/or nitrite ions is optionally encapsulated. It is understood that ammonium ions and nitrite ions as used herein refers to an ionic compound wherein a counter ion is included. For example, ammonium ions can be supplied as ammonium chloride. Polymers, that are hydrated, may be used to coat at least one reactant, for example $NaNO_2$. Exemplary hydrated polymers can include guar, chitosan and polyvinyl alcohol. Other binders, such as carboxymethyl cellulose or xanthan, may also be used as coating material, such as for at least one reactant such as $NH_4Cl$. The formation temperature will trigger the release of reactants from the coating polymer or binder. The heat of the formation, the activator, water for the formation, and the non-acidic well stimulation fluid can all play a role in the erosion or removal of the encapsulating material, which then leads to a reaction between the components and the subsequent generation of heat and gas. Upon encountering water or heat, the coating on one or both of the ammonium or nitrite containing compound dissolves, thereby allowing the reactants to react with each other.

Certain embodiments of the methods and composition described herein are responsible for the release of kinetic energy and thermal energy, which is a result of the exothermic nature of the oxidation-reduction reaction. In one embodiment, for example, aqueous solutions of $NH_4Cl$ and $NaNO_2$ can be mixed in the presence of an activator to generate heat, nitrogen gas, NaCl, and water. The generation of nitrogen gas, along with the resulting increased temperature, can result in an increase in the local pressure and the development of microfractures in the tight formation. The heat that is generated, as noted previously, assists with the reaction between the non-acidic well stimulation fluid and the formation.

In typical usage, the reaction between $NH_4Cl$ and $NaNO_2$ in the presence of an activator results in local generation of about 60 L of nitrogen per liter of reactants and about 225 Kcal of heat per liter of reactants. In certain embodiments, the reaction of ammonium ions and nitrite ions can result in the generation of at least about 50 Kcal of heat per liter of reactants, alternatively at least about 100 Kcal of heat per liter of reactants, alternatively at least about 150 Kcal of heat per liter of reactants, alternatively at least about 200 Kcal of heat per liter of reactants. It is believed that the increased pressure and temperature are sufficient to overcome the tensile strength of the formation, thereby leading to creation of tensile microfractures in the formation.

As shown in FIG. 1, the solubility of a sandstone formation in sodium hydroxide is shown as a function of temperature, demonstrating that sand has greater solubility in sodium hydroxide at higher temperatures, as well as at higher concentrations of sodium hydroxide. For example, solubility is shown to increase in a 5% NaOH solution from less than about 2.55 by weight to over 3% by weight over a 3 hour period at temperatures of about 25° C. and 55° C., respectively. A more concentrated 15% solution at a temperature of about 70° C. demonstrated a solubility of greater than about 4.5% by weight over a 3 hour period.

Figure 2:
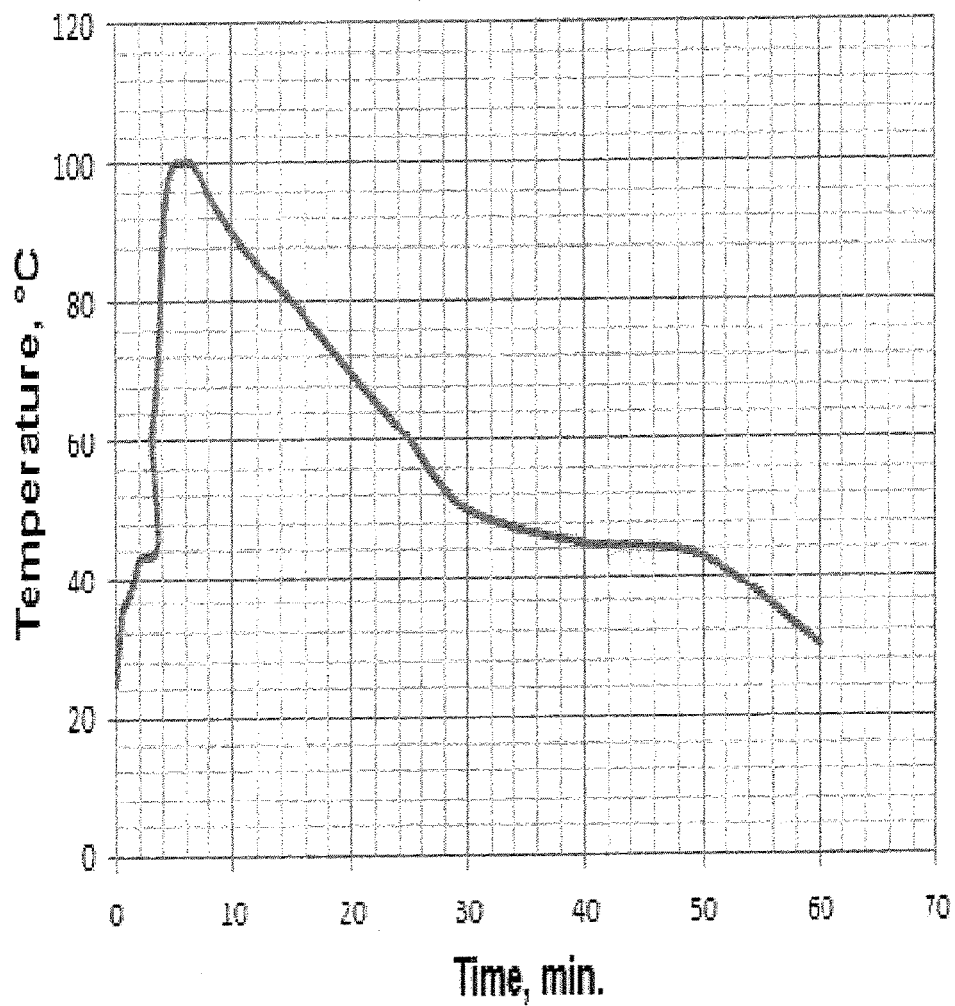
FIG. 2 is a graph showing the thermodynamic profile of the heat generating reaction according to one embodiment.

FIG. 2 shows the generation of heat as a function of time for the reaction of equimolar amounts of ammonium chloride and sodium nitrite. As shown, the temperature rises rapidly to a peak within about 10 minutes of reaction, maintaining an elevated temperature for approximately 20 minutes, and slowly cooling over the next 30 minutes. FIG. 2 provides a proof of concept that the temperature increases as a result of an exothermic reaction and that the reaction may be designed to reach a required temperature such that thermal fractures are created.

Figure 3:
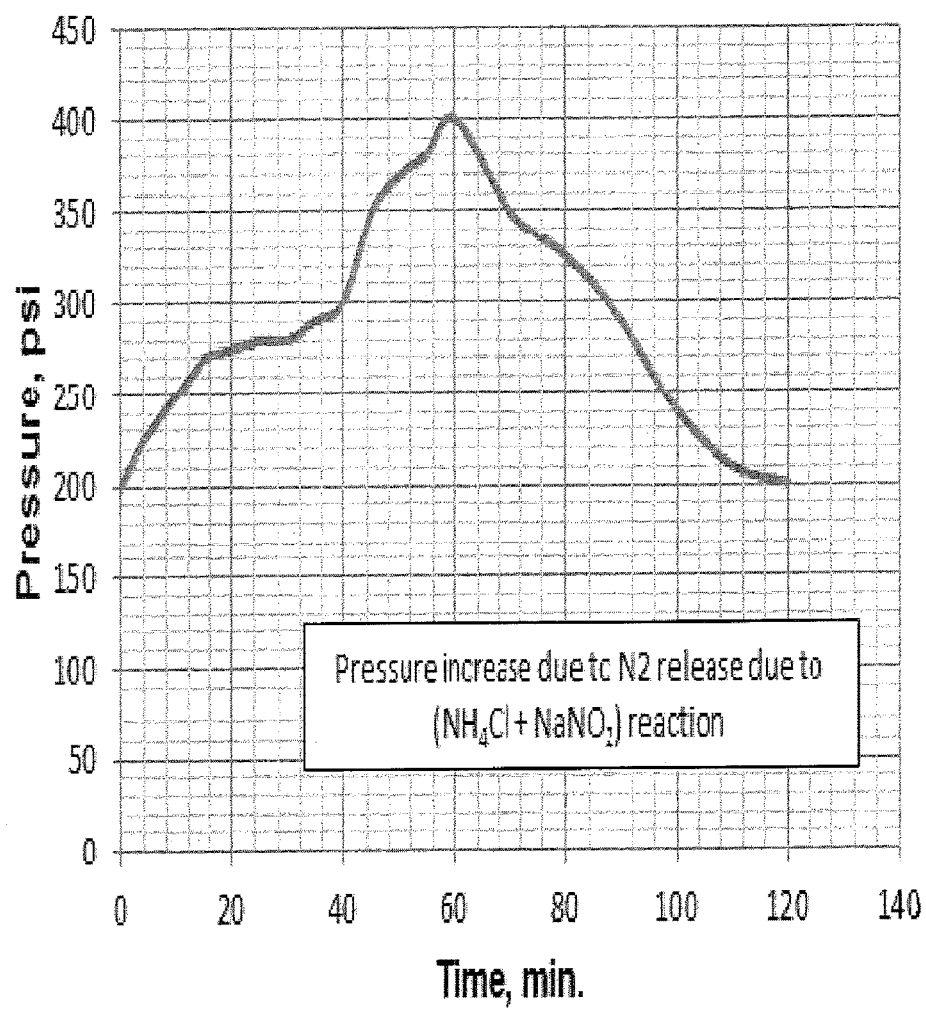
FIG. 3 is a graph showing the pressure profile of the heat generating reaction according to one embodiment.

FIG. 3 provides a graph showing the amount of pressure generated by the reaction of ammonium chloride and sodium nitrite. The test was run in a high temperature, high pressure press. Prior to initiating the reaction, the press was set at 200 psi. The reaction showed that the pressure gradually increased by about 200 psi during the reaction. FIG. 3 demonstrates that the pressure increase is due to the nitrogen gas generated as a result of the chemical reaction, and is a function of reactants concentration.

In an alternate embodiment, a multi-component composition that includes at least one ammonium containing compound and at least one nitrite containing compound can be injected into a formation, wherein at least one component can be encapsulated with a binder to form a solid matrix with the component. Exemplary encapsulating binders include 55-carboxymethyl cellulose, xanthan, and like compounds. Exemplary binders are preferably reactive with water or the non-acidic well stimulation fluid, and/or heat such that upon contact with well stimulation fluid or water, or upon heating, the binder erodes or dissolves, thereby allowing the reactants to react.

In another embodiment, a proppant can be suspended in the well stimulation fluid and can be injected into a formation. Along with the well stimulation fluid, a heat generating composition that includes at least one ammonium containing compound, at least one nitrite containing compound and optionally an activator, can be injected into the formation. In certain preferred embodiments, at least one of the ammonium containing compound and nitrite containing compound is encapsulated. In certain embodiments, a solution that includes the ammonium and nitrite ion containing composition can be injected directly into the formation before the well stimulation fluid is injected. In certain embodiments, the ammonium and nitrite ion containing solution can be injected into the formation approximately 5 minutes before the injection of the well stimulation fluid, alternatively approximately 10 minutes before injection of the well stimulation fluid, alternatively approximately 15 minutes before injection of the well stimulation fluid. The water and/or the heat of the formation can facilitate erosion of the encapsulating material such that the reaction between the ammonium and nitrite containing compounds is delayed, thereby allowing the heat generating composition to migrate and seep into the fractures within the formation.

In another embodiment, an aqueous composition that includes ammonium ions, nitrite ions, a non-acidic well stimulation fluid, and optionally a buffer, are injected into a formation in a well stimulation or a hydraulic fracturing procedure.

For each of the embodiments described herein, exemplary ammonium ions include ammonium chloride, ammonium bromide, ammonium nitrate, ammonium sulfate, ammonium carbonate, ammonium hydroxide, and the like.

Exemplary combinations of reactants for the heat generating composition can include: urea and sodium hypochlorite; urea and sodium nitrite; ammonium hydroxide and sodium hypochlorite; and ammonium chloride and sodium nitrite.

In certain embodiments, the heat generating composition includes equal molar amounts of the ammonium containing compound and the nitrite containing compound when they are supplied to the formation to ensure complete reaction of both components. In alternate embodiments, up to about a 5% excess of either component can be employed, however it is generally preferred that equimolar amounts are employed. Thus, in certain embodiments, the ratio of ammonium to nitrite in the compositions disclosed herein can range from between about 1.1:1 to 1:1.1; alternatively between about 1.05:1 and 1:1.05, alternatively about 1:1.

In certain embodiments, the procedures described herein can utilize the elevated temperatures within the formation as the activator for the reaction. For example, in certain embodiments, the temperature within the formation may be at least about 60-70° C. Typical formation temperatures are about 200° F. or higher.

In certain embodiments, the fluids used in this application can include certain chemical additives that can help to form a viscous fracturing fluid. The chemical additives can include at least one solvent and at least one polymer that is soluble in the solvent.

Generally, during successful hydraulic fracturing procedures, the fracturing liquid must be removed from the well upon completion of the stimulation treatment. The process can be both costly and time consuming. Advantageously, the compositions and methods described herein are designed to cause no damage to the formation, which is a challenge considering the current fracturing technologies. To overcome this problem, the compositions and methods described herein advantageously utilize novel combinations of nitrogen generating chemicals as the hydraulic fracturing liquid-base. Thus, in certain embodiments, the liquids used for fracturing of the formation, which can include the nitrogen generating chemicals previously described, can be injected into the formation though the wellbore or other injection means at a sufficiently high injection rate so as to create pressures within the formation that can effectively fracture the rock or open previously existing fractures. As the fracturing liquid seeps into the formation, these nitrogen generating chemicals can be triggered to react, thereby generating large amounts of nitrogen gas and heat within the formation and near the newly created fracture surfaces. In certain embodiments, the triggering mechanism can be the heat of the formation temperature. In alternate embodiments, the triggering mechanism can be an injected fluid, such as an acid, that can be injected at the end of the fracturing process. The generated nitrogen gas and heat can create additional microfractures and thermal fractures at or near the fracture formed as a result of the hydraulic fracturing. The reaction generates at least about 200 Kcal and 50 L of nitrogen gas per liter of the heat generating chemicals that is supplied to the reaction, alternatively about 225 Kcal and 60 L of nitrogen per liter of the heat generating chemicals supplied to the reaction.

In certain embodiments, the heat generating compounds can be supplied to the formation separately, for either the preflush fluids or the well stimulation fluids. For example, in certain embodiments, the preflush fluids that include brine and an ammonium containing compound can be injected into the formation. Following injection of the preflush fluids, a nitrite containing compound can be injected into the formation and the ammonium and nitrite compounds can react to produce heat and nitrogen gas. Alternately, in another embodiment, the preflush fluids can include brine and a nitrite containing compound. These preflush fluids are injected into the formation, followed by the injection of an ammonium containing compound, thereby allowing the nitrite and ammonium compounds to react to produce heat and nitrogen gas.

In certain embodiments, a polymer can be mixed with ammonium solution, nitrite solution, or a combination thereof, and can serve as the base fluid being injected in the formation. Thus, in certain embodiments, the non-acidic stimulation fluid can include a solvent base, such as water, a polymer viscosifying agent, and an ammonium containing compound. In such an embodiment, following the injection of the fracturing fluid, a nitrite containing compound can be injected into the formation.

In an alternate embodiment, the non-acidic well stimulation fluid can include a solvent base, such as water, a polymer viscosifying agent, and a nitrite containing compound. In such an embodiment, following the injection of the non-acidic well stimulation fluid, an ammonium containing compound would then be injected into the formation.

Advantageously, in contrast to some currently employed stimulation methods, the methods and compositions described herein do not produce any damaging by-products as a result of the in-situ reaction. For example, the acids utilized as activators are typically consumed by the reaction and are only present in relatively small quantities such that there is little or no residual acid remaining that may cause environmental concerns. As a result, following the stimulation procedure, no clean-up procedure is required. Thus, through the creation of the synthetic sweetspots, maximum enhancement of gas production with a minimal creation of damaging waste products is provided.

In certain embodiments, the methods and compositions described herein advantageously and unexpectedly eliminate formation damage that can be caused by a fracturing gel, water blockage, and/or condensate banking. These conditions result in reduced permeability of fluids within the formation, and subsequently lead to poor production of a well. The generation of the synthetic sweet spot according to the methods described herein avoids these problems.

In certain embodiments, the methods and compositions described herein advantageously and unexpectedly can be used to stimulate injector and producer wells, particularly in a sandstone formation.

The methods and compositions provided herein solve several problems that are frequently encountered during the construction of commercial wells in formations where acid stimulation is utilized.

First, problems associated with damage to the formation caused by current strong acid stimulation methods can be eliminated. For example, the methods and compositions described herein, advantageously help to eliminate the production of precipitates that can be locked near a recently created fracture surface by creating many tensile fractures near the fracture surface such that any filtrate readily flows through these fractures toward the well.

Second, the methods and compositions provided herein, advantageously enhance production over traditional strong acid stimulation methods through the slower reaction rates of the hydroxide compounds with the formation, allowing for controlled reaction such that new flow channels are created.

Finally, current strong acid stimulation techniques may require many fracturing stages to create sufficient reservoir volume contact within the well to be commercial are eliminated as a result of the production of microfractures due to the gas and heat that are produced. By reducing the number of required fracturing stages for the same production, the present stimulation treatment described herein is both more cost effective and accomplished more quickly; thereby providing viable economical options for the stimulation of low producing wells.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an", and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value.

When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

That which is claimed is:

1. A non-acidic well stimulation composition for use in a sandstone formation, the composition comprising:
    an ammonium ion containing compound;
    a nitrite ion containing compound, wherein at least one of the ammonium ion containing compound and nitrite ion containing compound is encapsulated with an erodible coating such that a reaction between the ammonium and nitrite ions is delayed in situ until the ammonium ion containing compound and the nitrite ion containing compound have migrated to within the sandstone formation, and wherein the ammonium ion containing compound and nitrite ion containing compound are present at concentrations sufficient to generate heat and nitrogen gas upon reacting with one another via an exothermic reaction within the sandstone formation; and
    a non-acidic well stimulation fluid, wherein the non-acidic well stimulation fluid comprises an alkali hydroxide or an alkaline earth hydroxide, wherein the alkali hydroxide or alkaline earth hydroxide is present and remains at a concentration to maintain a pH greater than 7 for the non-acidic well stimulation composition and operable to dissolve at least a portion of a sandstone formation without forming precipitates to create flow channels in the sandstone, at an increased temperature caused by the exothermic reaction between the ammonium ion containing compound and the nitrite ion containing compound, for between greater than about 1 hour to about 12 hours.

2. The composition of claim 1, wherein the non-acidic well stimulation fluid comprises sodium hydroxide.

3. The composition of claim 1, wherein the non-acidic well stimulation fluid comprises at least about 5% sodium hydroxide by weight.

4. The composition of claim 1, wherein the non-acidic well stimulation fluid comprises at least about 10% sodium hydroxide by weight.

5. The composition of claim 1, wherein the non-acidic well stimulation fluid comprises at least about 15% sodium hydroxide by weight.

6. The composition of claim 1, wherein the ammonium ion containing compound is selected from the group consisting of: ammonium chloride; ammonium bromide; ammonium nitrate; ammonium sulfate; ammonium carbonate; ammonium hydroxide; and mixtures thereof.

7. The composition of claim 1, wherein the nitrite ion containing compound is selected from the group consisting of: sodium nitrite; sodium hypochlorite; and mixtures thereof.

8. The composition of claim 1, wherein the coating encapsulating at least one of the ammonium ion containing compound and the nitrite ion containing compound is a polymer selected from the group consisting of: guar; chitosan; polyvinyl alcohol; and mixtures thereof.

9. The composition of claim 1, wherein the coating encapsulating at least one of the ammonium ion containing compound and the nitrite ion containing compound is selected from the group consisting of: carboxymethyl cellulose, xanthan, and mixtures thereof.

10. The composition of claim 1, wherein a molar ratio of the ammonium ion containing compound to the nitrite ion containing compound in the non-acidic well stimulation composition is between about 1.1:1 and 1:1.1.

11. The composition of claim 1, wherein the ammonium ion containing compound comprises ammonium chloride.

12. The composition of claim 1, wherein the nitrite ion containing compound comprises sodium nitrite.

13. The composition of claim 1, wherein the ammonium ion containing compound and nitrite ion containing compound are present in sufficient concentrations to increase the temperature within the sandstone formation by between about 50° C. and 100° C.

* * * * *